(12) United States Patent
Nichols

(10) Patent No.: US 8,390,992 B1
(45) Date of Patent: *Mar. 5, 2013

(54) CIRCUIT BREAKERS AND CIRCUIT BREAKER BOX

(76) Inventor: Mitchell A. Nichols, Spencer, WV (US)

( * ) Notice: Subject to any disclaimer, the term of this patent is extended or adjusted under 35 U.S.C. 154(b) by 113 days.

This patent is subject to a terminal disclaimer.

(21) Appl. No.: 13/095,519

(22) Filed: Apr. 27, 2011

Related U.S. Application Data

(63) Continuation of application No. 12/689,159, filed on Jan. 18, 2010, now Pat. No. 7,957,121, and a continuation-in-part of application No. 12/179,642, filed on Jul. 25, 2008, now abandoned, and a continuation-in-part of application No. 11/506,503, filed on Aug. 18, 2006, now abandoned.

(51) Int. Cl.
 *H02B 1/26* (2006.01)
(52) U.S. Cl. ........ 361/643; 361/627; 361/628; 361/633; 361/641
(58) Field of Classification Search .......... None
See application file for complete search history.

(56) References Cited

U.S. PATENT DOCUMENTS

| | | | |
|---|---|---|---|
| 2,767,353 A | 10/1956 | Kingdon | |
| 3,267,336 A | 8/1966 | Kussy et al. | |
| 3,491,268 A | 1/1970 | Christensen et al. | |
| 4,318,156 A | 3/1982 | Gallagher | |
| 4,327,396 A | 4/1982 | Schacht | |
| 4,369,484 A | 1/1983 | Fugate et al. | |
| 4,712,157 A | 12/1987 | Simonson et al. | |
| 5,216,203 A | 6/1993 | Gower | |
| 5,272,592 A | 12/1993 | Harris et al. | |
| 5,352,850 A | 10/1994 | Norris | |
| 5,404,266 A | 4/1995 | Orchard et al. | |
| 5,627,720 A | 5/1997 | Lewis | |
| 5,640,295 A | 6/1997 | Harris et al. | |
| 5,784,249 A | 7/1998 | Pouliot | |
| 6,002,580 A | 12/1999 | LeVantine et al. | |
| D431,535 S | 10/2000 | Kubis et al. | |
| 6,147,304 A | 11/2000 | Doherty | |
| 6,315,580 B1 | 11/2001 | Hurtubise et al. | |
| 6,472,605 B1 | 10/2002 | Griffith | |
| 6,756,541 B1 | 6/2004 | Mollick et al. | |
| 6,765,787 B2 | 7/2004 | Beasley et al. | |
| 6,829,124 B2 | 12/2004 | Leopold et al. | |
| 6,878,004 B2 | 4/2005 | Oh | |
| 6,998,531 B2 | 2/2006 | Hull | |
| 7,005,590 B1 | 2/2006 | Willis | |
| 7,405,923 B2 | 7/2008 | Kelly et al. | |
| 7,468,883 B2 | 12/2008 | Mann | |
| 7,511,945 B2 | 3/2009 | Scott | |

*Primary Examiner* — Boris Chervinsky

(57) ABSTRACT

A circuit breaker box comprising a main circuit breaker for operatively connecting to hot service wires; first and second hot bus bars configured to receive power from the main circuit breaker; a plurality of receiver terminals configured to transfer power from a circuit breaker component to a first wire of an electrical circuit; and a safety shield for enclosing the hot bus bars and receiver terminals, wherein a plurality of slots is disposed in the safety shield, the slots are aligned with the first or second hot bus bars and receiver terminals, wherein the circuit breaker component comprises a first and a second prong contact for contacting the first or second hot bus bar and a receiver terminal, respectively.

8 Claims, 4 Drawing Sheets

CIRCUIT BREAKERS AND CIRCUIT BREAKER BOX

CROSS REFERENCE

This application is a continuation-in-part and claims priority to U.S. patent application Ser. No. 11/506,503 filed Aug. 18, 2006, and to U.S. patent application Ser. No. 12/179,642 filed Jul. 25, 2008, the specifications of which are incorporated herein by reference in their entirety.

FIELD OF THE INVENTION

The present invention is directed to circuit breaker boxes, circuit breakers, and components thereof.

BACKGROUND OF THE INVENTION

Each home and building has a circuit breaker box with a plurality of circuit breakers. The circuit breakers help protect electrical circuits from damage caused by short circuits or overload. For example, a circuit breaker functions to detect a faulty condition and immediately block electrical flow. Standard circuit breaker boxes have hot bus bars in the middle of the box with exposed male prongs that can be very dangerous. Also, the main breaker must be turned off (all power is lost to the home or building) in order to work on the box (e.g., change wires). The present invention features an improved circuit breaker box and corresponding circuit breakers that provide improved safety.

In the circuit breaker box of the present invention, the hot bus bars are positioned on one side of the housing, and they comprise female slots (e.g., female receiver terminals). The hot bus bars can be covered with a safety cover (safety shield) to make it shock-resistant to the worker. The female configuration (and safety shield) can help improve safety. Without wishing to limit the present invention to any theory or mechanism, it is believed that the circuit breaker box of the present invention is advantageous because it can allow a user to add or change wires without needing to turn off the main circuit breaker.

SUMMARY

The present invention features a circuit breaker box and circuit breaker components. The circuit breaker box comprises a main circuit breaker, the main circuit breaker can be operatively connected to two hot service wires; a first hot bus bar and a second hot bus bar, the first hot bus bar and the second hot bus bar are each configured to receive power from the main circuit breaker, wherein a first prong contact of a circuit breaker component can be operatively connected to the first hot bus bar or the second hot bus bar such that the circuit breaker component can draw power from the first hot bus bar or the second hot bus bar; a plurality of receiver terminals, wherein a second prong contact of a circuit breaker component can be operatively connected to a receiver terminal, each receiver terminal is configured to allow power to transfer from the a circuit breaker component to a first wire of an electrical circuit; and a safety shield for enclosing at least the first hot bus bar, the second hot bus bar, and the receiver terminals, wherein a plurality of wire apertures is disposed in the safety shield for allowing the first wire of the electrical circuit to traverse the safety shield; wherein a plurality of first slots, second slots, and third slots is disposed in a front surface of the safety shield, the first slots are each aligned with a position on the first hot bus bar, the second slots are each aligned with a position on the second hot bus bar, and the third slots are each aligned with a position on a receiver terminal, wherein the first prong contact of the circuit breaker component when inserted into a first slot or second slot can contact the first hot bus bar or second hot bus bar, respectively; and wherein the second prong contact of the circuit breaker component when inserted into a third slot can contact the receiver terminal.

In some embodiments, a plurality of female receiver terminals is disposed in the first hot bus bar and in the second hot bus bar, the female receiver terminals are adapted to receive the first prong contact of the circuit breaker component. In some embodiments, a second female receiver terminal is disposed in each receiver terminal, the second female receiver terminal is adapted to receive the second prong contact of the circuit breaker component and to receive the first wires of the electrical circuit. In some embodiments, the circuit breaker box further comprises a ground bar, the ground bar can be operatively connected to a main ground wire and a ground wire of the electrical circuit.

In some embodiments, the first hot bus bar, the second hot bus bar, and the receiver terminals are mounted on an insulator component disposed in the circuit breaker box. In some embodiments, the safety shield is a plastic cover. In some embodiments, the circuit breaker box further comprises the circuit breaker component, the circuit breaker component is removable, wherein the first prong contact of the circuit breaker component extends outwardly from a first end of the circuit breaker component, the second prong contact extends outwardly from a second end of the circuit breaker component, the second prong contact is operatively connected to the first prong contact via a standard circuit breaker configuration, wherein the first prong contact and the second prong are adapted to operatively contact the first or second hot bus bar and a receiver terminal, respectively.

In some embodiments, the first prong contact is configured to draw power from the first hot bus bar or the second hot bus bar, and the second prong contact is configured to transfer power to the receiver terminal. In some embodiments, the first prong is adapted to be inserted into a first or second slot in the safety shield, and the second prong is adapted to be inserted into a third slot in the safety shield.

The circuit breaker component comprises a first prong contact extending outwardly from a first end; and a second prong contact extending outwardly from a second end, the second prong is operatively connected to the first prong via a standard circuit breaker configuration; wherein the first prong contact is adapted to operatively contact a first hot bus bar or a second hot bus bar of a circuit breaker box, and the second prong is adapted to operatively contact a receiver terminal of the circuit breaker box.

In some embodiments, the first prong contact is configured to draw power from the first hot bus bar or the second hot bus bar, and the second prong contact is configured to transfer power to the receiver terminal. In some embodiments, the first prong contact is adapted to be inserted into a first slot or a second slot of a safety shield of the circuit breaker box, and the second prong contact is adapted to be inserted into a third slot of the safety shield of the circuit breaker box. In some embodiments, the first prong contact is adapted to be operatively connected to a position on a first hot bus bar or a position on a second hot bus bar via a first female receiver terminal disposed in the first hot bus bar or the second hot bus bar, and the second prong contact is adapted to be operatively connected to a position on a receiver terminal via a second female receiver terminal disposed in the receiver terminal.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 4 also shows how wiring is routed.

DESCRIPTION OF PREFERRED EMBODIMENTS

Figure 1:
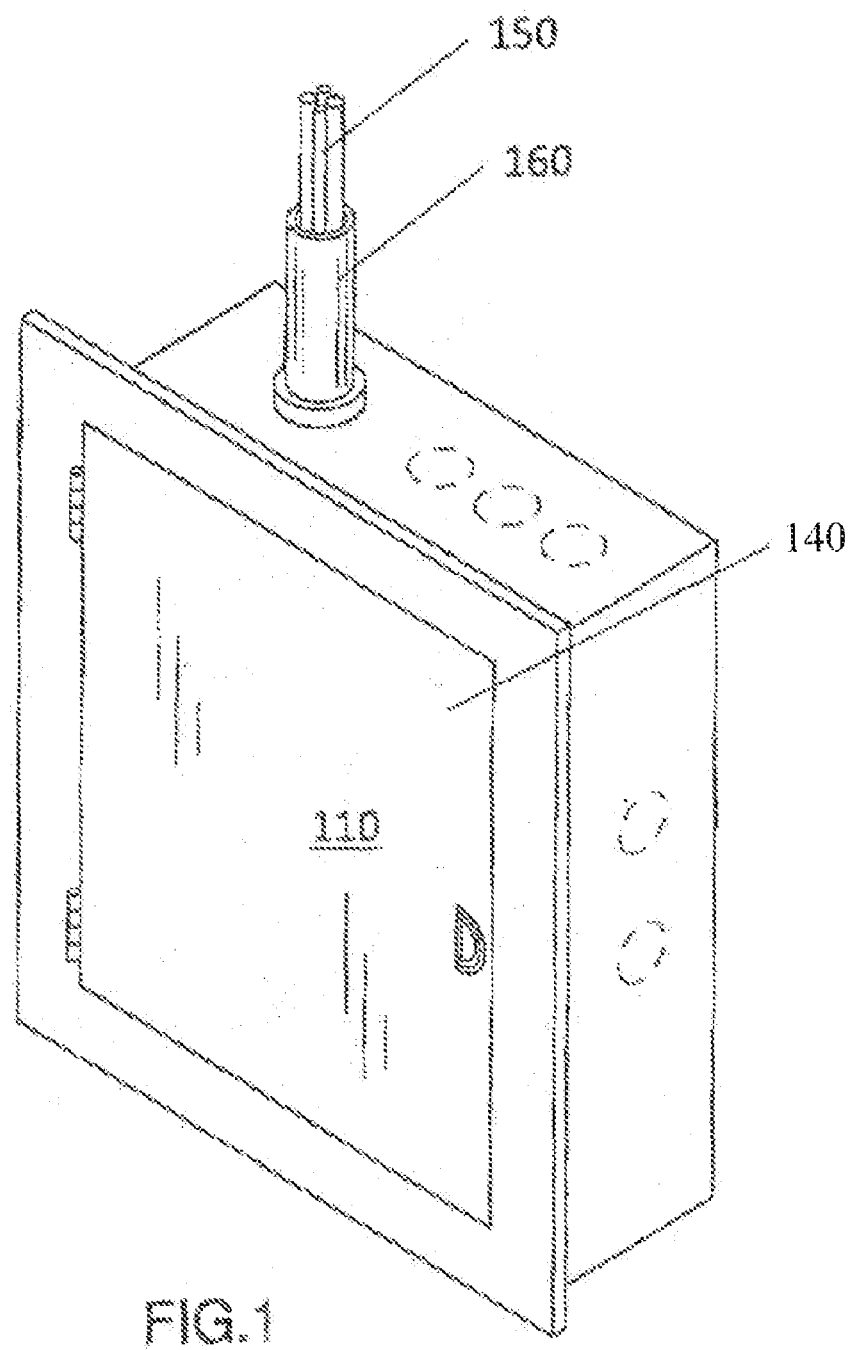
FIG. 1 is a perspective view of the circuit breaker box 110 (housing) of the circuit breaker system 100 of the present invention. In some embodiments, the conduit 160 and entrance wires 150 are not part of the box (e.g., can be obtained separately).

Referring now to FIGS. 1-4, the present invention features a circuit breaker system 100. The circuit breaker system 100 of the present invention comprises a circuit breaker box 110 and one or more circuit breaker components 210 (e.g., 110V circuit breaker components 210a, 240V circuit breaker components 210b). The circuit breaker box 110 may resemble standard circuit breaker boxes. For example, the circuit breaker box 110 is a housing having an inner cavity for holding a safety shield 220, which covers electrical components such as hot bus bars 310 and receiver terminals 320. The safety shield 220 also has slots for prongs on circuit breaker components 210 to pass through. The safety shield 220 also has small openings for a screwdriver to tighten set screws or receiver terminals 320. The circuit breaker box 110 comprises a door 140 that can move between an open position and a closed position for respectively allowing and preventing access to the inner cavity.

The circuit breaker box 110 comprises a standard main circuit breaker 162. Standard main circuit breakers are well known to one of ordinary skill in the art. For example, hot service wires (e.g., entrance wires 150), such as a first hot service wire and a second hot service wire, provide power from a power source (entrance wires 150 are shown entering the circuit breaker box 110 via a conduit 160) to the standard main circuit breaker 162. In some embodiments, the conduit 160 and entrance wires 150 are not part of the box (e.g., can be obtained separately). The hot service wires (e.g., entrance wires 150) are operatively connected to the main circuit breaker 162 via entrance wire lugs 166 (see FIG. 4). The entrance wire lugs 166 may be covered via a cover plate 165 (see FIG. 3). The main circuit breaker 162 allows current to be turned on and off. The standard main circuit breaker 162 can also help protect the hot service wires from overload.

In addition to the first hot service wire and the second hot service wire, a main ground wire and a main common wire (neutral) are brought in/out via the conduit 160. The main ground wire is connected to a ground bar 440 (e.g., via lugs, setscrew terminals). The main common wire is connected to a neutral bar 450 (e.g., via lugs, setscrew terminals).

Power from the first hot service wire is transferred through the main circuit breaker 162 to a first hot bus bar 310a, and power from the second hot service wire is transferred from the main circuit breaker 162 to a second hot bus bar 310b. The hot bus bars 310 supply power to and transfer power to the individual circuit breaker components 210. In some embodiments, each bus bar supplies (or transfers) 110V or 120V of power.

Figure 4:
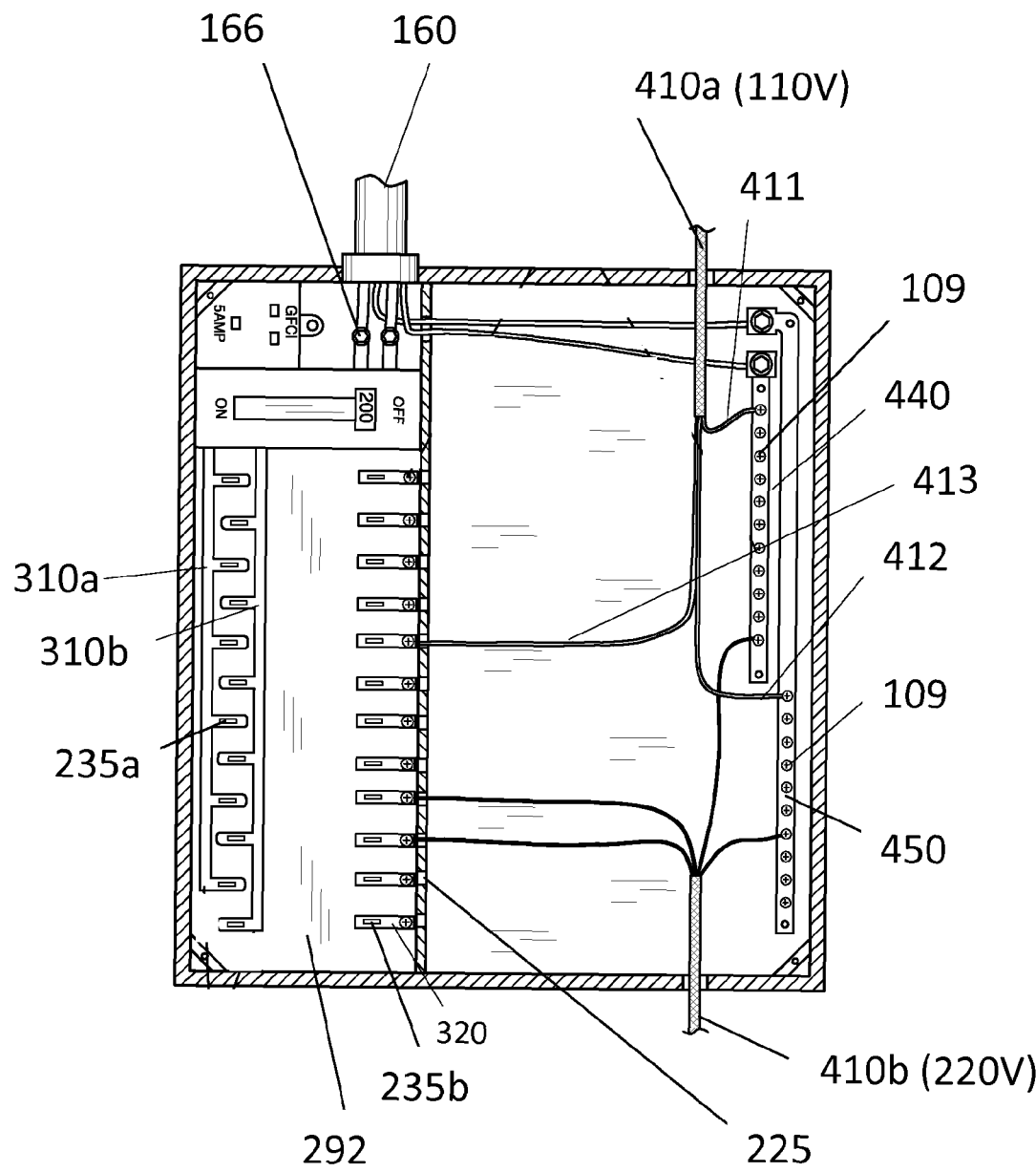
FIG. 4 is a front exposed view of the circuit breaker box of the circuit breaker system 100 of the present invention. This view is with the safety cover/shield removed to show both hot bus bars and receiver terminals.

FIG. 4 shows a first hot bus bar 310a and a second hot bus bar 310b. In some embodiments, a 120V circuit breaker component 210a contacts the first hot bus bar 310a (e.g., via a prong contact 215 on the circuit breaker component 210), and the power is transferred via the 120V circuit breaker component 210a to a receiver terminal 320 (from there going to the electrical systems such as appliances and lights, etc., by means of wiring/electrical circuits 410a). In some embodiments, a 240V circuit breaker component 210b contacts the first hot bus bar 310a and the second hot bus bar 310b (e.g., via prong contacts 215 on the circuit breaker component 210b), and the power is transferred via the circuit breaker component 210b to two of the receiver terminals 320 (from there going to the electrical systems such as appliances or other applications requiring 240V by means of wiring/electrical circuits 410b). In some embodiments, the wiring/electrical circuits 410a, 410b are not part of the circuit breaker box 110 (e.g., is obtained separately). The receiver terminals 320 are adapted to receive prong contacts of the circuit breaker component 210 and to receive the first wires 410a, 410b of the electrical circuit.

In some embodiments, the first hot bus bar 310a and the second hot bus bar 310b comprise first female receiver terminals 235a and the receiver terminal 320 comprises second female receiver terminals 235b. The female receiver terminals 235 are portions of the hot bus bars 310 or receiver terminal 320 that directly contact the prongs of the circuit breaker components 210 (e.g., they are adapted to receive the prongs of the circuit breaker components 210) (see FIG. 4). The receiver terminals 235 can "operatively connect" the hot bus bars 310 and receiver terminal 320 to the circuit breaker components 210. The second female receiver terminals 235b of the receiver terminals 320 are adapted to receiver the prongs of the circuit breaker components and the first wires 410a, 410b of the electrical circuit.

As shown in FIG. 4, ground wires 411 from electrical circuits (e.g., 110V circuits 410a or 220V circuits 410b) of electrical systems (e.g., home wiring, a light, an appliance, a group of electrical systems, etc.) can be connected to the ground bar 440 (e.g., via setscrew terminals 109). Because the main ground wire is also connected to the ground bar 440, the ground wires 411 of the electrical circuits 410a are ultimately connected to the main ground wire. Ground wires are well known to one of ordinary skill in the art. For example, the ground bar 440 may connect the ground wires to a main grounding conductor (e.g., a metal cold water pipe, a grounding rod driven into the Earth, etc.).

Common wires 412 (neutral wires) can be connected to the neutral bar 450 (e.g., via setscrew terminals 109). Because the main common wire is also connected to the neutral bar 450, the common wires 412 of the electrical circuits 410a are ultimately connected to the main common wire. Common (neutral) wires are well known to one of ordinary skill in the art.

As shown in FIG. 4, a first wire 413 (e.g., hot wire, black wire, colored wire) of an electrical circuit 410a is operatively connected to a receiver terminal 320 (e.g., via a setscrew terminal, etc.). This is in contrast to standard circuit breaker boxes, wherein this first wire 413 would connect to a first terminal of a circuit breaker. As shown in FIG. 4, a pair of first wires of a 220V electrical circuit 410b is operatively connected to a pair of receiver terminals 320 (e.g., via setscrew terminals, etc.).

In some embodiments, the circuit breaker box 110 of the present invention comprises a GFCI outlet 250 (e.g., a built-in outlet for a user to get power for a light or small tool, for example if the safety cover needs to come off for inspection, etc.). GFCI outlets are well known to one of ordinary skill in the art (but are not installed in breaker boxes).

The safety shield 220 covers the hot components of the inner cavity of the circuit breaker box 110. The safety shield 220 may be used to hold one or more circuit breaker components 210 in place. For example, the safety shield 220 may enclose both the hot bus bars 310 and the receiver terminals 320. In some embodiments, the safety shield 220 extends from the top surface of the circuit breaker box 110 to the bottom surface of the panel 110. The safety shield 220 has a front surface and a side surface. In some embodiments, a plurality of wire apertures 225 is disposed in the safety shield 220, for example in the side surface of the safety shield 220. The wire apertures 225 are for receiving a wire (e.g., the first wire) of the electrical circuit 410. The first wire 410 is connected to a receiver terminal 320 (e.g., via a setscrew terminal, etc.) when inside the safety shield 220 (See FIG. 2).

Disposed in the front surface of the safety shield 220 is a plurality of slots 230 (e.g., first slots 230a, second slots 230b, third slots 230c). The slots 230 are holes for providing the prong contacts 215 of the circuit breaker components 210a, 210b access to the hot bus bars 310a, 310b and receiver terminals 320. The slots 230 are aligned with the hot bus bars 310a, 310b and receiver terminals 320. For example, the first slots 230a are aligned with the first hot bus bar 310a, the second slots 230b are aligned with the second hot bus bar 310b, and the third slots 230c are aligned with the receiver terminals 320 (see FIG. 3). In some embodiments, the slots 230 are aligned with the female receiver terminals 235a, 235b disposed in the hot bus bars 310a, 310b and/or in the receiver terminals 320, which are adapted to receive the prongs of the circuit breaker components 210, providing electrical contact between the prongs 215 and the hot bus bars 310a, 310b, and receiver terminals 320. For example, the first slots 230a and second slots 230b are aligned with first female receiver terminals 235a, and the third slots 230c are aligned with second female receiver terminals 235b. The slots 230 also allow the circuit breaker components 210 to be held in place.

Figure 2:
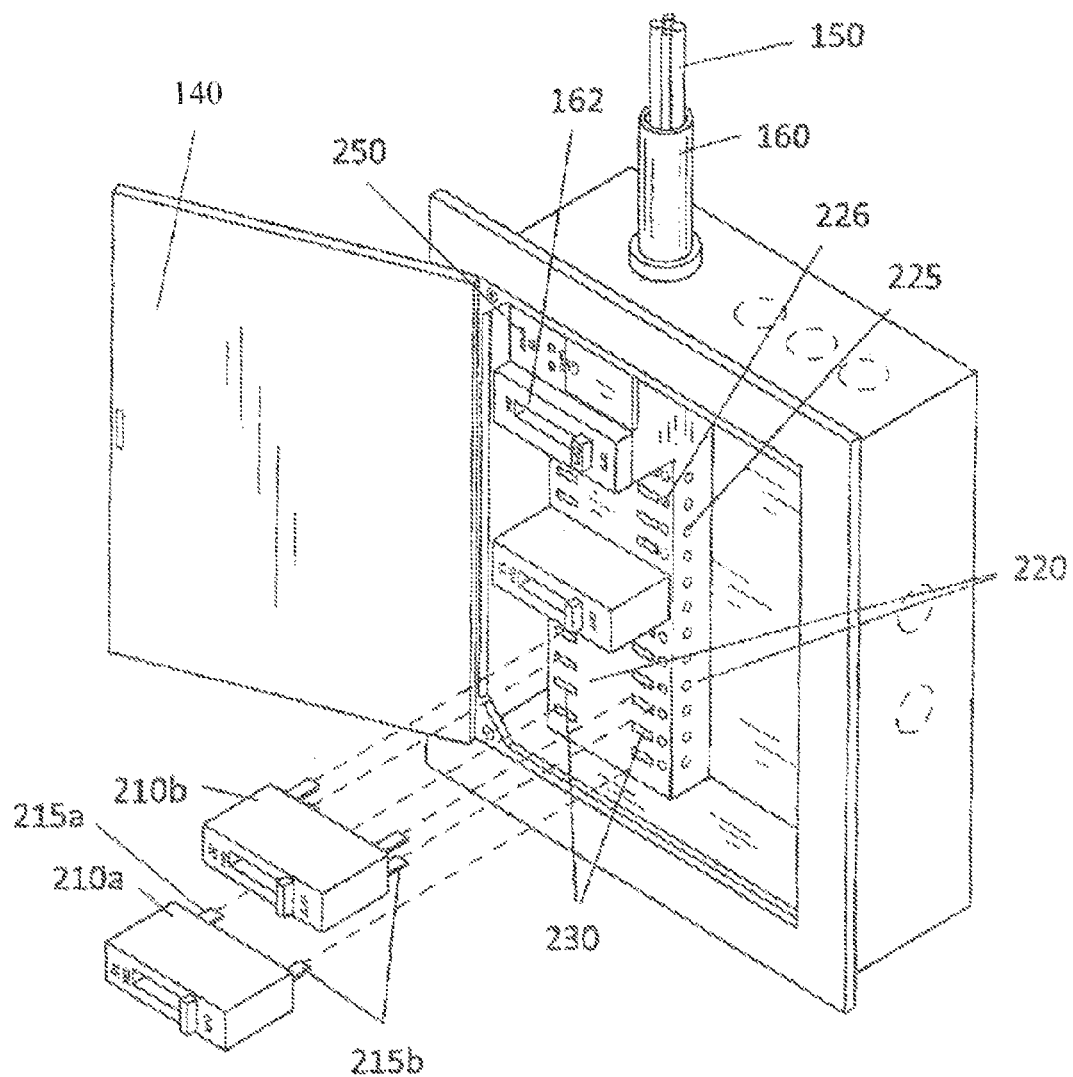
FIG. 2 is an exploded view of the circuit breaker box 110 and circuit breaker component 210 of the circuit breaker system 100 of the present invention. The circuit breaker components are removed. This view does not show wiring.
Figure 3:
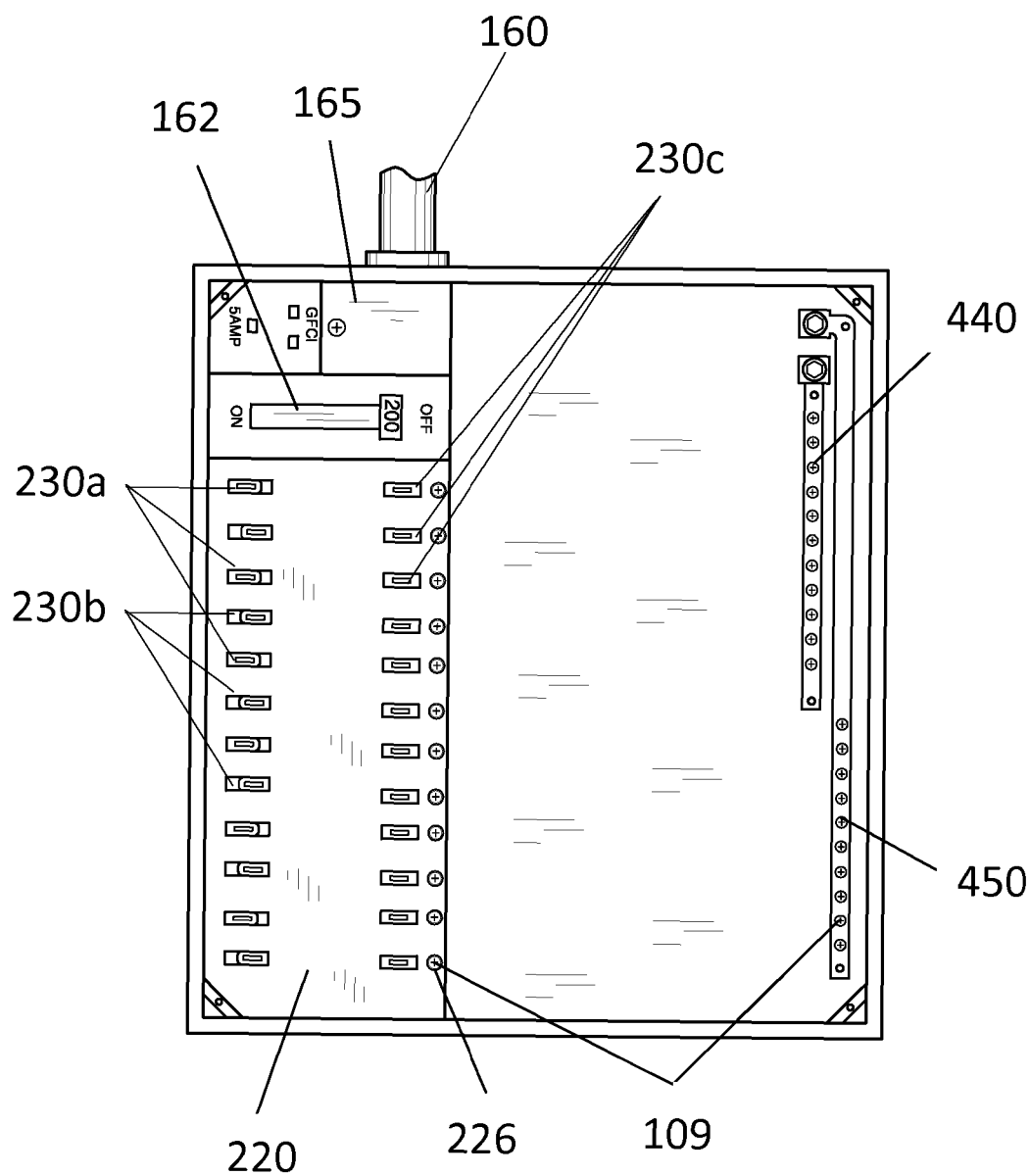
FIG. 3 is a front view of the circuit breaker box 110 of the circuit breaker system 100 of the present invention. This view is with no circuit breaker components or wiring.

As shown in FIG. 2, in some embodiments, one or more tool insertion holes 226 are disposed in the safety shield 220. The tool (screw driver) insertion holes 226 provide access to set screws on 320 under the safety shield 220. In some embodiments, tool insertion holes 226 are disposed adjacent to all slots 230c.

Standard circuit breakers and the electrical components thereof are well known to one of ordinary skill in the art. Generally, in a standard circuit breaker, a wire component for the hot bus bar is inserted inside the circuit breaker and connected to a setscrew terminal (e.g., the circuit breaker has a female connection mechanism). The hot wire is connected to a second setscrew terminal on the circuit breaker.

In the circuit breaker component 210 of the present invention, the circuit breaker component 215 comprises prong contacts 215 (e.g., a male connection mechanism) in lieu of setscrew terminals. The prong contacts 215 extend outwardly from the circuit breaker component 210. The first hot bus bar 310 and receiver terminal 320 of the present invention are configured to contact and draw/transfer power from/to the circuit breaker component 210 via the prong 215 contacts disposed on the circuit breaker component 210. For example, a first prong contact 215a of the circuit breaker component 210a (e.g., disposed near a first end) contacts the first hot bus bar 310a (e.g., via a first female receiver terminal 235a), receiving power from the main circuit breaker. Or a pair of first prong contacts 215a of the circuit breaker component 210b contacts both the first hot bus bar 310a and the second hot bus bar 310b. The power travels through the circuit breaker component 210 (in a standard way, known to one of ordinary skill in the art), and is delivered to a receiver terminal 320 via a second prong contact 215b, of the circuit breaker component 210a (e.g., disposed on a second end). Or power from the circuit breaker component 210b is delivered to receiver terminals 320 via a pair of second prong contacts 215b. The second prong contact 215b may contact a second female receiver terminal 235b on the receiver terminal 320. From the receiver terminal 320, power is delivered via the first wire (e.g., hot wire) to the electrical circuits/systems 410.

The circuit breaker component 210a with a first prong contact 215a and a second prong contact 215b (two prongs) provides 110V-120V of power. The circuit breaker component 210b with a pair of first prong contacts 215a and a pair of second prong contacts 215b (four prongs) provides 220V-240V of power. Each hot bus bar 310 is 110V-120V. Using one provides 110V-120V of power, using two provides 220V-240V of power.

In some embodiments, the safety shield 220 comprises insulation, a plastic cover, etc. The safety shield 220 may be constructed from any material that can function as a protective cover. In some embodiments, the safety shield 220 covers the hot components of the box 110 so as to prevent objects from falling into or being pushed into the hot components (e.g., hot bus bars) unintentionally. The safety shield 220 has slots 230 for allowing the circuit breaker components 210 to be connected to the hot bus bars 310 and receiver terminals 320.

An insulator component 292 is common in standard breaker boxes. In some embodiments, the insulator component 292 goes under all hot components of the box (e.g., hot bus bars 310, receiver terminals 320). This insulator component 292 helps prevent hot components from coming in contact with the circuit breaker box 110 (housing), which would cause a short in the circuit. The hot bus bars 310 and receiver terminals 320 can be mounted to the insulator component 292, or placed under hot components in common practices.

Without wishing to limit the present invention to any theory or mechanism, it is believed that the circuit breaker system 100 of the present invention is advantageous because the design utilizing prong contacts 215 on the circuit breaker component 210 that contact the bus bars directly allows for improved safety. The circuit breaker system 100 of the present invention (e.g., the circuit breaker box 110 and the circuit breaker components 210) is safe and user friendly.

The present invention is not limited to breaker boxes. For example, disconnect boxes are similar to breaker boxes but are mounted outside a home or building. As used herein, the term "breaker box" may refer to either a breaker box or a disconnect box.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A circuit breaker box comprising:
   (a) a main circuit breaker, the main circuit breaker can be operatively connected to hot service wires;
   (b) a first hot bus bar and a second hot bus bar, the first hot bus bar and the second hot bus bar are each configured to receive power from the main circuit breaker, wherein a first prong contact of a circuit breaker component can be operatively connected to the first hot bus bar or the second hot bus bar such that the circuit breaker component can draw power from the first hot bus bar or the second hot bus bar, respectively;
   (c) a plurality of receiver terminals, wherein a second prong contact of a circuit breaker component can be operatively connected to a receiver terminal, each receiver terminal is configured to allow power to transfer from the a circuit breaker component to a first wire of an electrical circuit; and
   (d) a safety shield for enclosing at least the first hot bus bar, the second hot bus bar, and the receiver terminals, wherein a plurality of wire apertures is disposed in the safety shield for allowing the first wire of the electrical circuit to traverse the safety shield;
   wherein a plurality of first slots, second slots, and third slots is disposed in a front surface of the safety shield, the first slots are each aligned with a position on the first hot bus bar, the second slots are each aligned with a position on the second hot bus bar, and the third slots are each aligned with a position on a receiver terminal, wherein the first prong contact of the circuit breaker component when inserted into a first slot or second slot can contact the first hot bus bar or second hot bus bar, respectively; and wherein the second prong contact of the circuit breaker component when inserted into a third slot can contact the receiver terminal,
   wherein the circuit breaker component is removable, wherein the first prong contact of the circuit breaker component extends outwardly from a first end of the circuit breaker component, the second prong contact extends outwardly from a second end of the circuit breaker component, the second prong contact is operatively connected to the first prong contact via a standard circuit breaker configuration, wherein the first prong contact and the second prong are adapted to operatively contact the first or second hot bus bar and a receiver terminal, respectively.

2. The circuit breaker box of claim 1, wherein the first prong contact is configured to draw power from the first hot bus bar or the second hot bus bar, and the second prong contact is configured to transfer power to the receiver terminal.

3. The circuit breaker box of claim 1, wherein the first prong is adapted to be inserted into a first or second slot in the safety shield, and the second prong is adapted to be inserted into a third slot in the safety shield.

4. The circuit breaker box of claim 1 further comprising a GFCI outlet.

5. A circuit breaker component comprising:
   (a) a first prong contact extending outwardly from a first end; and
   (b) a second prong contact extending outwardly from a second end, the second prong is operatively connected to the first prong via a standard circuit breaker configuration;
   wherein the first prong contact is adapted to operatively contact a first hot bus bar or a second hot bus bar of a circuit breaker box, and the second prong is adapted to operatively contact a receiver terminal of the circuit breaker box.

6. The circuit breaker component of claim 5, wherein the first prong contact is configured to draw power from the first hot bus bar or the second hot bus bar, and the second prong contact is configured to transfer power to the receiver terminal.

7. The circuit breaker component of claim 5, wherein the first prong contact is adapted to be inserted into a first slot or a second slot of a safety shield of the circuit breaker box, and the second prong contact is adapted to be inserted into a third slot of the safety shield of the circuit breaker box.

8. The circuit breaker component of claim 5, wherein the first prong contact is adapted to be operatively connected to a position on a first hot bus bar or a position on a second hot bus bar via a first female receiver terminal disposed in the first hot bus bar or the second hot bus bar, and the second prong contact is adapted to be operatively connected to a position on a receiver terminal via a second female receiver terminal disposed in the receiver terminal.

* * * * *